United States Patent
Hall et al.

(10) Patent No.: US 10,260,512 B2
(45) Date of Patent: Apr. 16, 2019

(54) METHOD FOR RELEASE OF FAN BLISK AIRFOIL WITH EXTERNAL SHAPED CHARGE

(71) Applicant: Rolls-Royce Corporation, Indianapolis, IN (US)

(72) Inventors: Christopher Hall, Indianapolis, IN (US); Graham Burkholder, Indianapolis, IN (US); Xuekun Sun, Carmel, IN (US); Jeff Crutchfield, Indianapolis, IN (US); Ben Hodgson, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 471 days.

(21) Appl. No.: 15/212,027

(22) Filed: Jul. 15, 2016

(65) Prior Publication Data
US 2018/0017065 A1    Jan. 18, 2018

(51) Int. Cl.
| | |
|---|---|
| G01M 15/14 | (2006.01) |
| F04D 27/00 | (2006.01) |
| F02K 3/06 | (2006.01) |
| F01D 5/34 | (2006.01) |
| F01D 21/00 | (2006.01) |
| F04D 29/32 | (2006.01) |

(52) U.S. Cl.
CPC ............ *F04D 27/001* (2013.01); *F01D 5/34* (2013.01); *F01D 21/003* (2013.01); *F02K 3/06* (2013.01); *F04D 29/322* (2013.01); *F05D 2220/36* (2013.01); *F05D 2260/83* (2013.01)

(58) Field of Classification Search
USPC ....................................... 73/112.01
See application file for complete search history.

(56) References Cited

U.S. PATENT DOCUMENTS

| | | | |
|---|---|---|---|
| 7,445,433 B2 | 11/2008 | Chivers et al. | |
| 2010/0158693 A1* | 6/2010 | Viegas | F01D 5/282 |
| | | | 416/223 R |
| 2012/0296575 A1* | 11/2012 | McMillan | F01D 21/003 |
| | | | 702/40 |
| 2015/0330246 A1 | 11/2015 | Whitehead et al. | |
| 2018/0016934 A1* | 1/2018 | Hall | F01D 21/003 |

FOREIGN PATENT DOCUMENTS

EP     2206892     7/2010

* cited by examiner

*Primary Examiner* — Eric McCall
(74) *Attorney, Agent, or Firm* — McCracken & Gillen LLC

(57) ABSTRACT

According to one aspect, a method of releasing a fan blade for testing a turbofan engine includes arranging an external shaped charge about an airfoil and modifying the airfoil by extricating one or more portions of material from one or more sides of the airfoil. The method further includes detonating the external shaped charge such that the airfoil is released at a selected time.

18 Claims, 13 Drawing Sheets

PRIOR ART

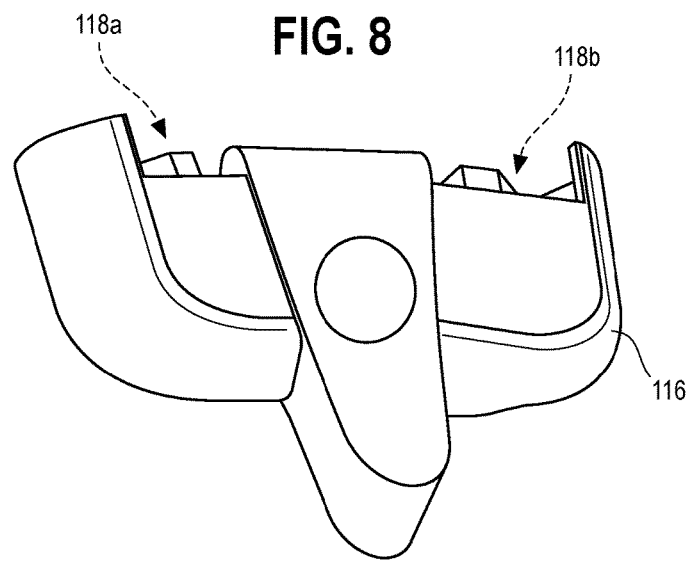
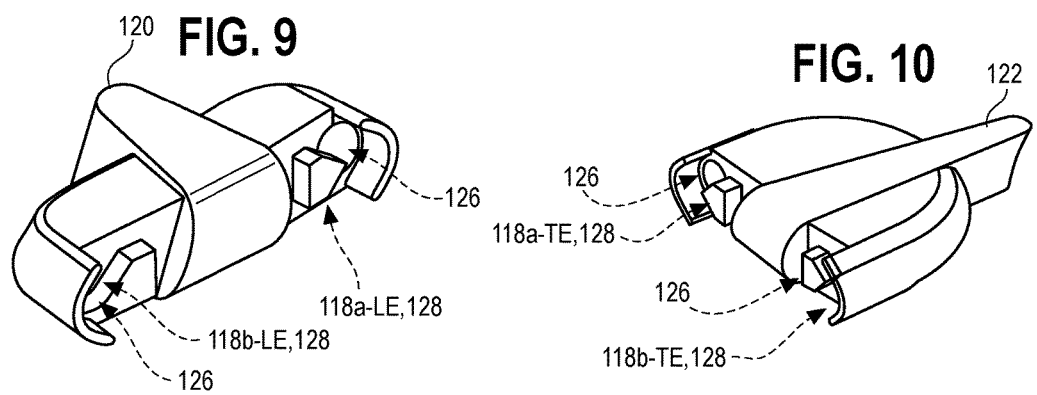
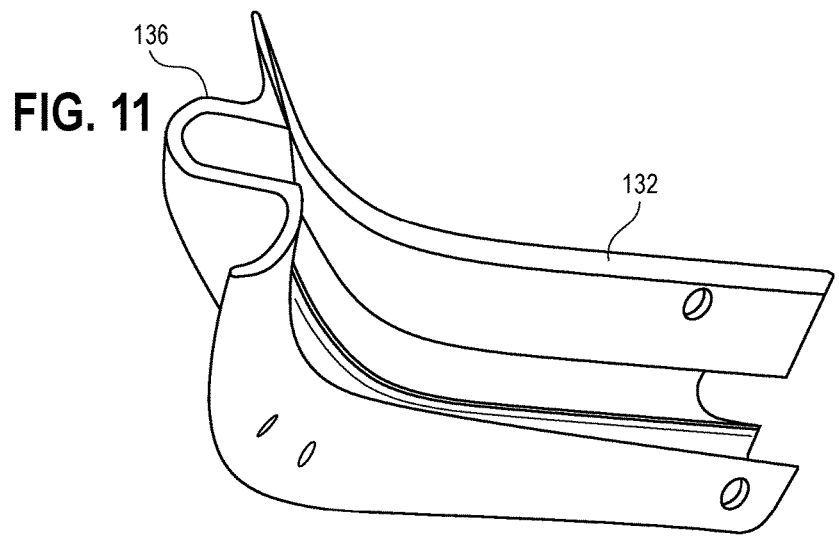

METHOD FOR RELEASE OF FAN BLISK AIRFOIL WITH EXTERNAL SHAPED CHARGE

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

FIELD OF DISCLOSURE

The present subject matter relates to engines, and more particularly, to methods for detaching blades from turbofan engines.

BACKGROUND

Turbofan engines are frequently employed in aviation. In order for a turbofan engine to be effective in an aviation application, it is typically placed close to other critical portions of an aircraft. For example, a turbofan engine may be mounted on a wing thus placing the turbofan engine in close proximity with both the wing and the fuselage of the aircraft. Therefore, operation of such a turbofan engine must meet certain safety standards.

Safety standards and precautions for turbofan engines are important during all phases of operation, including start-up, shutdown, normal operation, and failure. Safety may be of particular concern during failure of the engine, especially when failure involves the fan itself. One type of failure condition is known as "fan blade off." "Fan blade off" refers to separation of a fan blade from the turbofan shaft. During a fan blade off event, a containment case housing the turbofan engine, specifically the portion of the containment case around the fan, is expected to prevent the fan blade from travelling along a path that damages the wing or fuselage.

Referring now to the prior art design shown in FIG. 1 a typical turbofan engine 30 is illustrated. The turbofan engine 30 includes a fan containment case 32 surrounding a turbofan 34 and a number of compressor stages. The fan blade(s) 36 are secured to a shaft 38 by way of a rotor disk or hub 40, as seen in FIG. 2, during normal operation. Conventional turbofan engines employ fan blade(s) 36 that are not integral to the rotor disk 40. Instead, the fan blade(s) 36 are individually joined to the rotor disk 40 by dovetail joints. The rotor disk 40 has mounting slots 42 arranged around an exterior surface thereof.

As seen in FIG. 3, each fan blade 36 includes blade root 44, a blade platform 46, and an airfoil 48. The fan blade root 44 of each fan blade 36 slides into the respective mounting slot 42 such that the root 44 is mostly within the associated mounting slot 42. The blade platform 46 is outside of the mounting slot 42 but remains in close proximity with the rotor disk 40. Blade platforms 46 of adjacent fan blades 36 align very close to one another. The airfoil 48 extends away from the blade platform until the tip thereof terminates just before reaching the interior surface of the turbofan case 32, as shown in FIG. 1.

During normal operation, the shaft 38 rotates thereby rotating the rotor disk 40. The rotor disk 40 in turn produces the rotation of the fan blade(s) 36 around the shaft 38. However, occasionally the engine experiences a fan blade off event as discussed hereinabove. Upon separation from the shaft 38, the fan blade 36 strikes the case 32. During the fan blade off event, the fan blade travels in both a radial/circumferential and possibly axial, although axial movement is typically undesirable, direction away from the turbofan shaft 38. This movement results in the fan blade moving out towards the fan case. The fan blade 36 escaping from the fan case 40 is a safety hazard and may result in damage to the fuselage or wing caused by an impact from the escaped fan blade 36. Therefore, it is an objective of engine design to contain a separated fan blade 36 during a fan blade off event, and such containment may be required for particular certifications.

A need exists for testing turbofan engines and the casings thereof during fan blade off events. Such testing is performed by causing the fan blade(s) 36 to separate from the rotor disk 40 under controlled/observable test conditions. Explosives may be used to cause this separation. Referring now to FIG. 4, a prior art method for separating a fan blade 36 from the rotor disk 40 is depicted. A straight hole 50 is drilled in the thick portion of the fan blade 36 between the blade root 44 and before the blade platform 46, this is often referred to as the "stalk". In this illustration, the airfoil 48 is out of view above the platform 46. The thickness of the fan blade 36 proximal the blade root 44 allows for a hole to be drilled near the blade root 44 and likewise easily filled with an explosive charge suitable for causing separation of the fan blade. This is possible because the thickness of the blade stalk 44 allows for the hole 50 to be easily drilled wide enough that ample explosive material may be used to indiscriminately release the fan blade 36 upon detonation or deflagration. Furthermore, in conventional turbofan engines a common failure point is the root or stalk 44 and dovetail joint because this connection point between the fan blade 36 and the rotor disk 40 experiences significant stress during operation.

SUMMARY

According to one aspect, a method of releasing a fan blade for testing a turbofan engine includes arranging an external shaped charge about an airfoil and modifying the airfoil by extricating one or more portions of material from one or more sides of the airfoil. The method further includes detonating the external shaped charge such that the airfoil is released at a selected time.

According to another aspect, an assembly for releasing a fan blade from a turbofan engine during testing includes an airfoil, an external shaped charge arranged about the airfoil, and one or more detonators operatively coupled to the external shaped charge. The airfoil of the assembly is modified to accommodate the external shaped charge, and the airfoil is further modified to selectively weaken the airfoil.

According to yet another aspect, a method of simulating a blisk fan blade off event includes arranging an external shaped charge about a fan blade such that the external shaped charge is disposed radially outside of a blade platform and a blade root, and detonating the external shaped charge such that the fan blade is released. According to this method the portion of the fan blade outside of the blade platform is released while the blade platform and the blade root are not released such that the portion of the fan blade released by the external shaped charge approximates a blisk airfoil.

Other aspects and advantages will become apparent upon consideration of the following detailed description and the attached drawings wherein like numerals designate like structures throughout the specification.

BRIEF DESCRIPTION OF THE DRAWINGS

FIG. 8 shows an isometric view from above of an example detonator holder;

FIG. 9 shows an isometric view of a leading edge detonator holder;

FIG. 10 shows an isometric view of a trailing edge detonator holder;

FIG. 11 shows an isometric view of the charge holder from the interior side;

DETAILED DESCRIPTION

Figure 1:
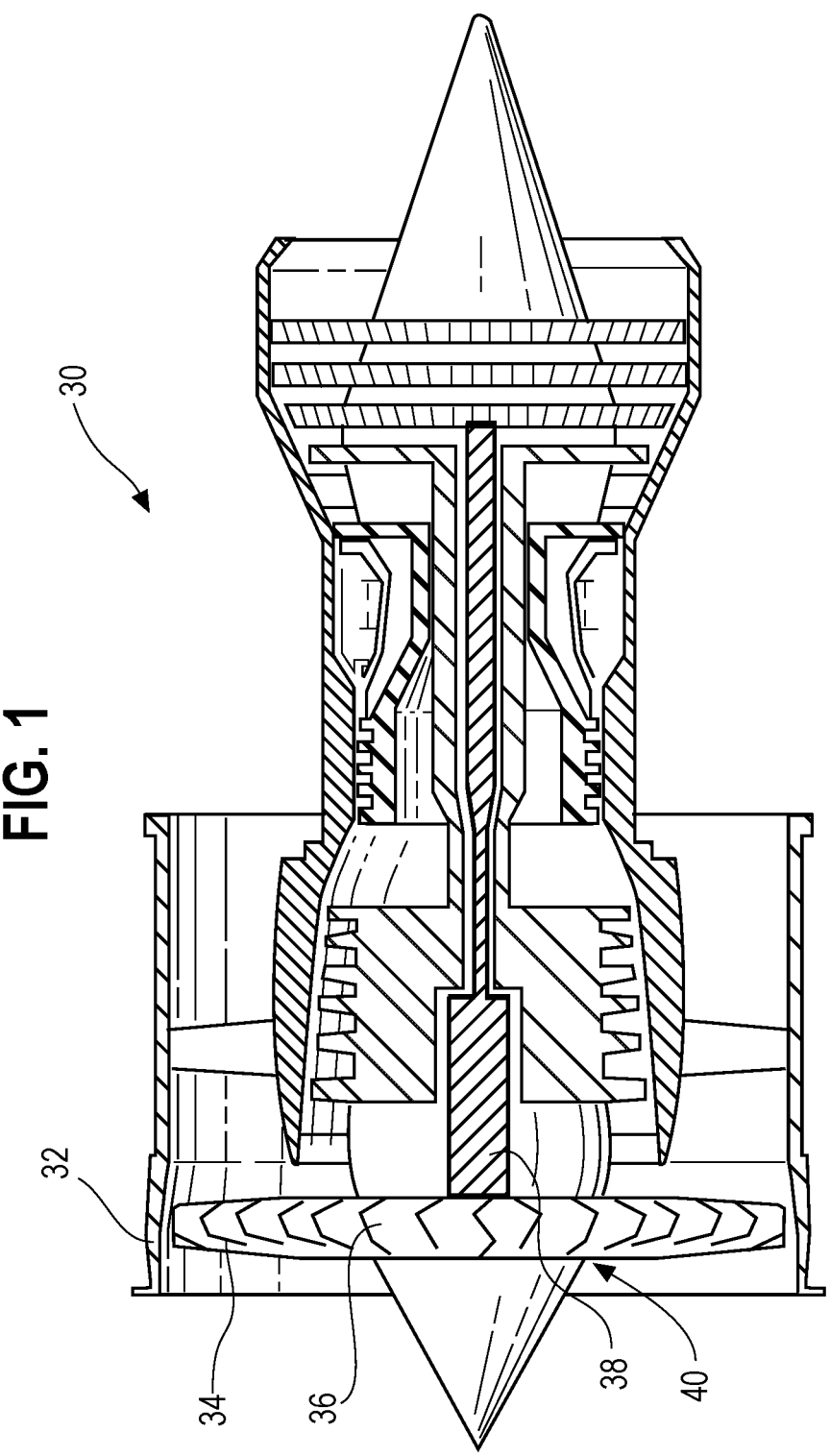
FIG. 1 shows cross-section of a turbofan engine.
Figure 4:
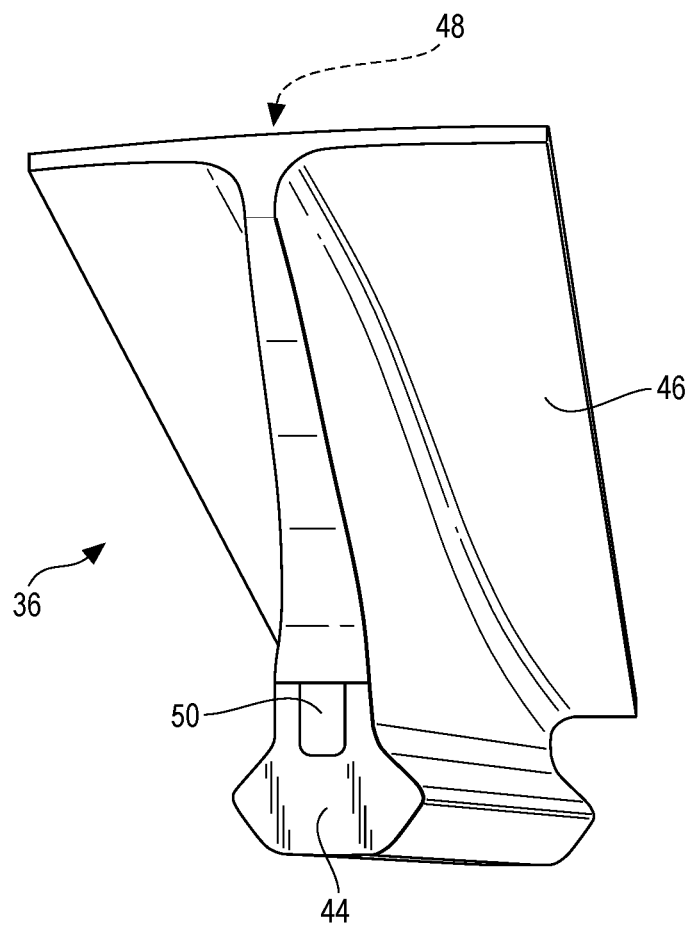
FIG. 4 shows a cross-section of a conventional separate fan blade with a hole through the fan blade stalk.

Referring again to FIG. 1, a turbofan engine 30 is shown with a fan 34 and fan case 32. As described above, during a fan blade off event, the fan blade 36 travels in both a circumferential and radial direction away from the shaft 38. This movement results in the fan blade 36 moving out through a fan track liner. It is an objective of the fan case 32 to contain the radial and axial movement of the separated fan blade 36 and keep the fan blade 36 from escaping the fan case 32. Further, containment may be required to meet certain certifications. It is desirable to test the turbofan engine 30 during a fan blade off event. As discussed with reference to FIG. 4 hereinabove, the existing methodology for fan blade release typically requires the drilling of a hole through the fan blade 36 at or near the relatively thick area of the blade stalk 44.

Figure 5:
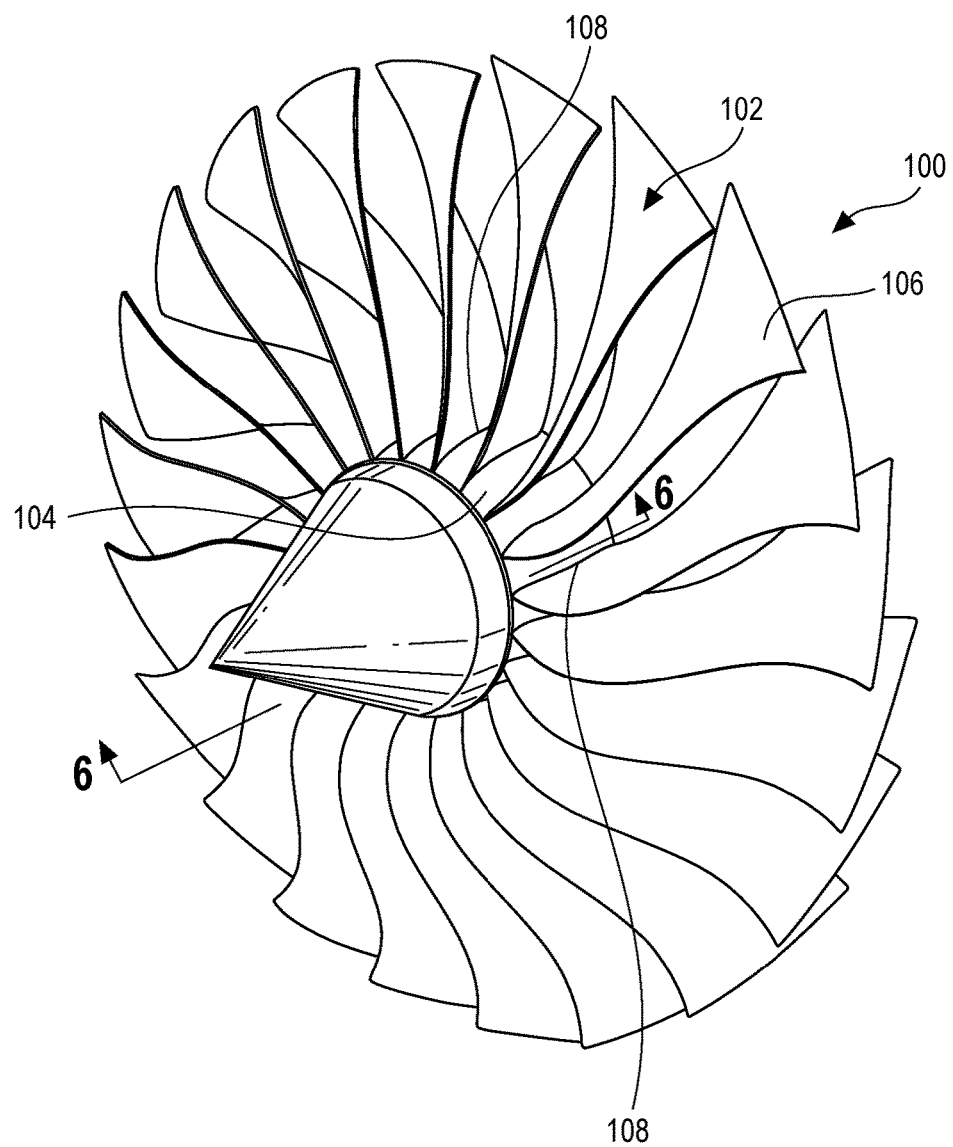
FIG. 5 shows an isometric view of the blisk turbofan.
Figure 6:
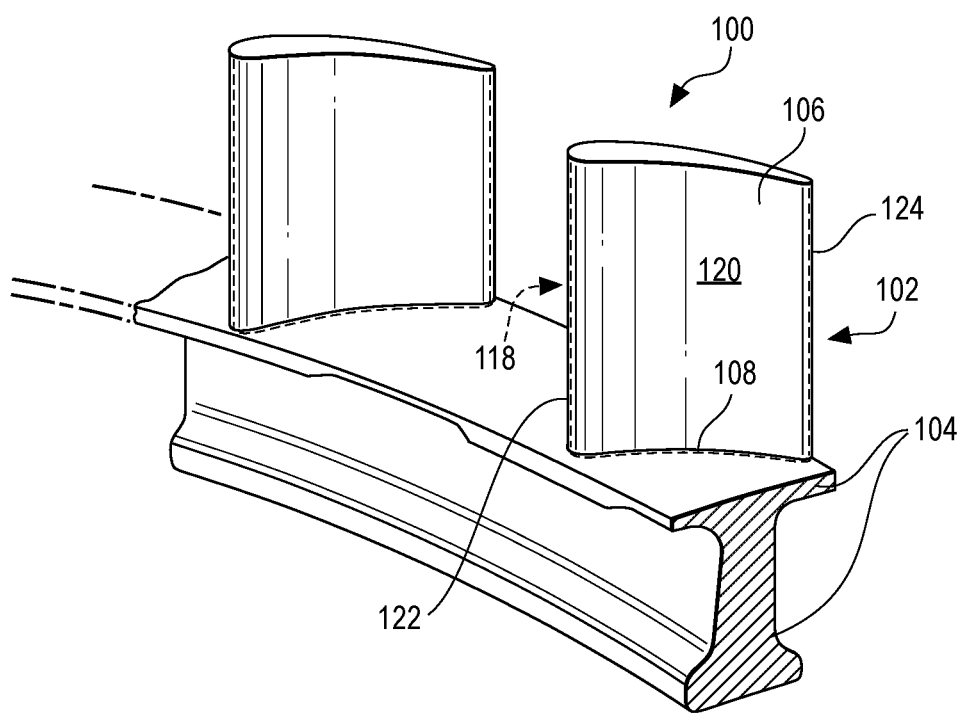
FIG. 6 shows a cross-sectional view of a blisk turbofan.

The turbofan engine 30 may use conventional fan blades 36 that attach to the rotor disk 40 at a dovetail joint, as described above. However, the turbofan engine 30 may instead use an integrally bladed rotor or bladed disk ("blisk"). Referring to FIGS. 5 and 6, a blisk 100 is shown. The blisk 100 comprises a single component.

Figure 2:
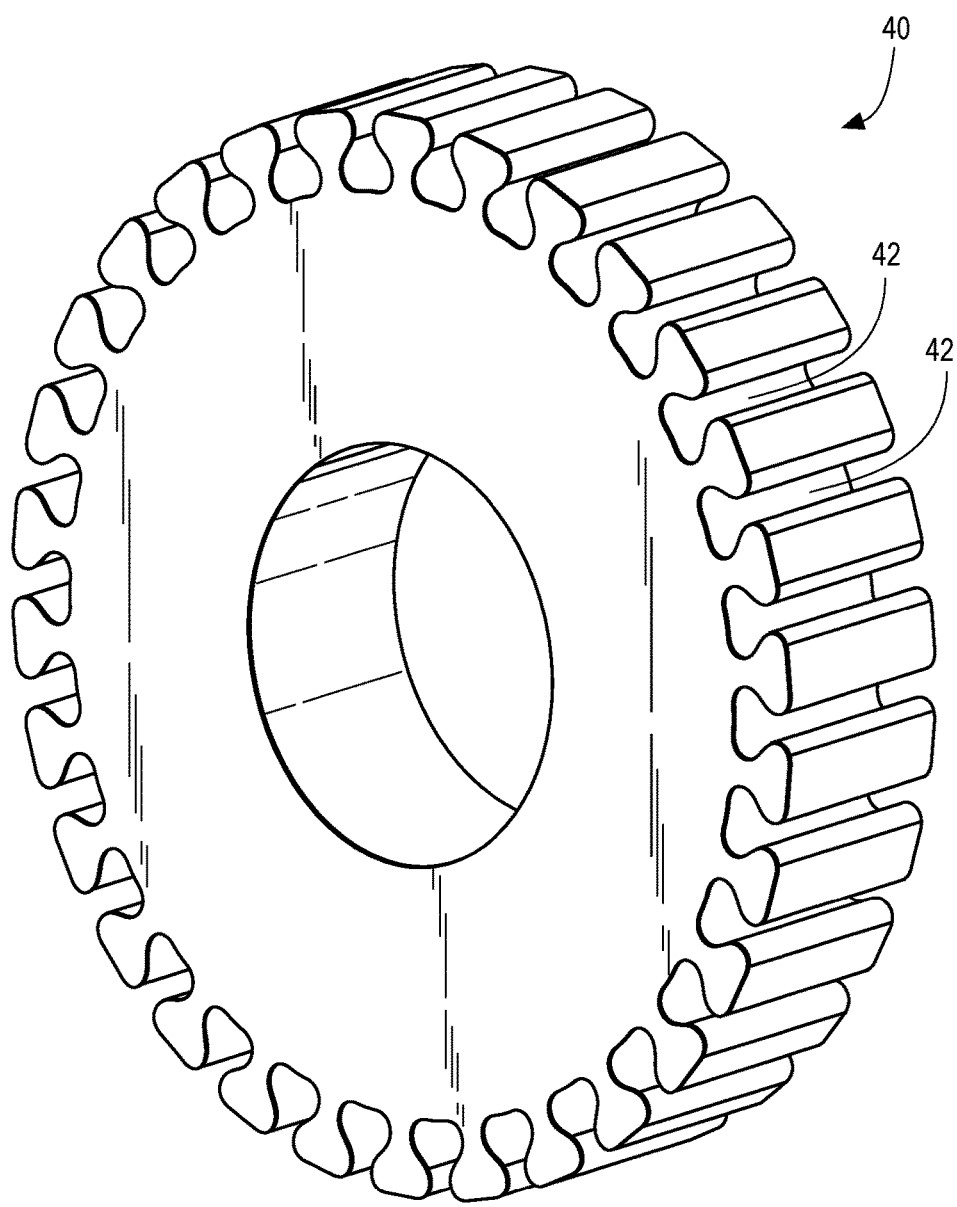
FIG. 2 shows an isometric view of a turbofan rotor disk.
Figure 3:
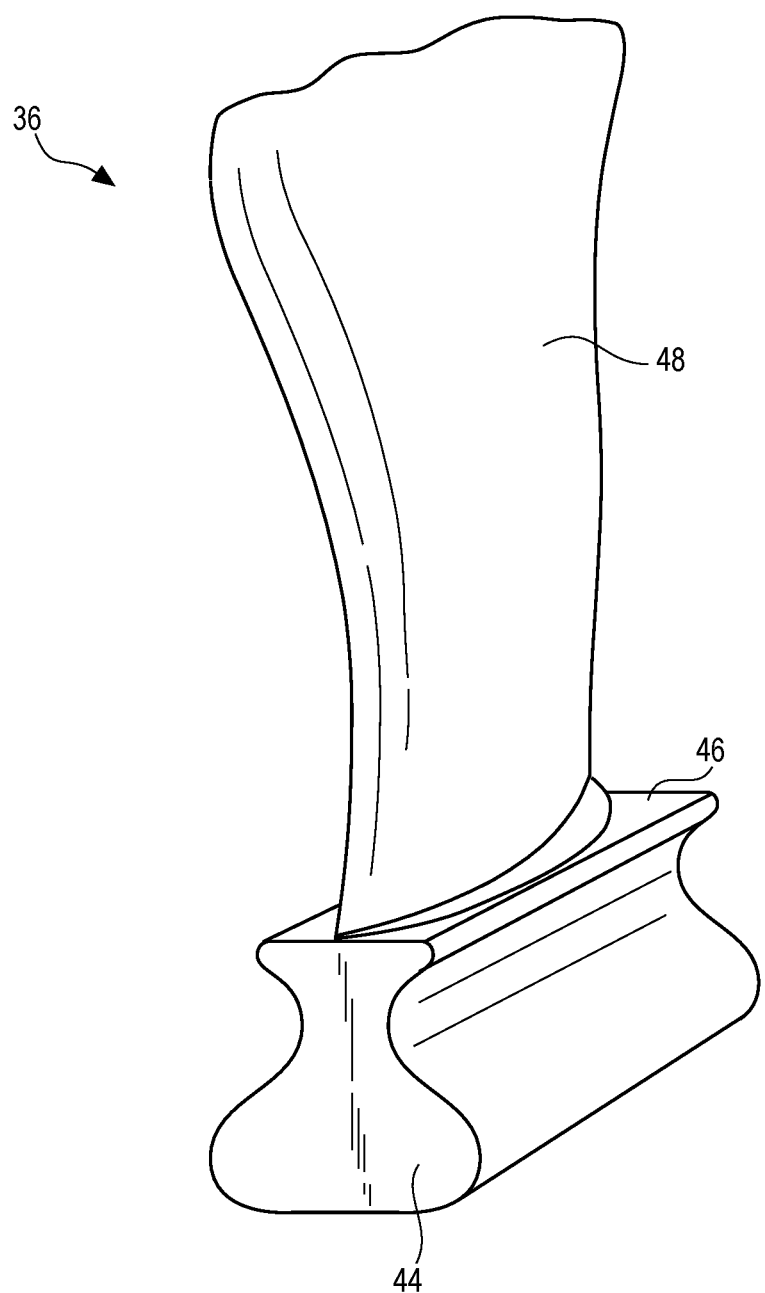
FIG. 3 shows an isometric view of an individual conventional fan blade.

The conventional fan 34 is an assembled component including the rotor disk 40 and a plurality of individual fan blades 36 removably inserted into the respective mounting slots 42, as seen in FIGS. 2 and 3. Whereas the conventional fan 34 is assembled from a number of separate parts including numerous connection points and interfaces, the blisk 100 (FIG. 5) is integrally formed. Blisks may be machined from a single piece of metal, forged or cast as one part, or welded together into a single piece. The unique nature and manufacture of the blisk 100 may affect how the turbofan engine 30 experiences failure. Particularly, a fan blade off event for the blisk 100 may be different from that of that of the conventional turbofan 34. Likewise, testing the turbofan engine 30 during a fan blade off event with the blisk 100 may be desirable during an engine development program. Further, such testing is needed to meet requirements for particular certifications.

Referring to FIG. 6, the blisk 100 is shown in partial cross-section along the line 6-6. The absence of a dovetail joint results in removal of the blade root 44 as embodied by the example conventional fan blade 36 of FIG. 3. While the fan blade 36 depicted in FIG. 3 is an example conventional fan blade 36, changes in shape and joint configuration do not alter the underlying principle of comparison and overall structural differences of the conventional fan blade 36 as contrasted with the blisk fan blade 102. The conventional fan blade 36 may include a fir tree joint, a curved blade root, a linear blade root, a shaped blade root, or any other suitable root and/or stalk.

However, regardless of the shape or specific configuration of the fan blade root 44 of the conventional fan blade design 36 it is absent from the blisk fan blade 102. The blisk fan blade 102 may only reach a maximum thickness at a connection point 108 between a blisk fan airfoil 106 and the blisk hub 104, as seen in FIG. 6. As the blisk fan airfoil 106 extends away from the blisk hub 104 a thickness thereof decreases until termination of the fan blade 102 at a respective fan blade tip.

Likewise, the absence of the blade root and/or stalk 44 and the dovetail joint further results in the removal of the blade platform 46 as it is embodied in FIG. 3. Instead, referring now to FIG. 6, the blisk fan airfoil 106 connects directly with the blisk hub 104 at the connection point 108. In the conventional turbofan 34 design, the blade platform 46 provides an aerodynamic inner flow path for air travelling over the platforms through the fan stage. The blade platforms 46 of adjacent fan blades 36 are arranged to align with minimal gaps therebetween, creating a surface that is relatively smooth for air to flow over.

The configuration of the blade platforms 46 provides a secondary surface that has aerodynamic qualities surrounding the numerous connection points of the conventional turbofan design, which otherwise would have joints, mounting slots 42, and blade stalks 44 exposed to the airflow through the turbofan 34 stage. However, in a blisk design, blade platforms 46 are not included, once again because the blisk fan airfoil(s) 106 attach directly to the blisk hub 104 at connection point 108. Therefore, an analogous aerodynamic inner surface for the blisk 100 turbofan design is provided by the outer surface of the blisk hub 104.

Removal of the blade platform 46 and blade root 44 provides the advantages of decreased overall thickness of the blisk fan blade 102 thus realizing possible improvements in aerodynamics and weight reduction. Furthermore, the changes resulting from the blisk 100 design alter the failure points of the turbofan engine 30. During a fan blade off event, the blisk fan blade 102 may fail at or near the connection point 108. In contrast, the conventional fan blade 36 fails at or near the blade stalk 44 thus releasing the blade platform 46 along with the conventional airfoil 48. Therefore, as compared with the conventional bladed turbofan 34 design, a fan blade off event for the blisk 100 concerns a smaller and lighter projectile. The released blisk fan blade 102 does not include the mass of the blade platform 46 and blade stalk 44.

The fan blade off event of the blisk 100 turbofan design may be tested either with a full or partial blisk or may be simulated by releasing only the airfoil 48 from the conventional fan blade 36. This testing approach may be referred to as a simulated blisk fan airfoil 110. However, the thin airfoil 48 of the conventional design generally may not provide sufficient material or space to enclose a chordwise internal hole while still maintaining structural integrity during start-up and operation of the turbofan engine 30 prior to airfoil 106, 110 release. Furthermore, the conventional method as described with reference to FIG. 4 does not allow for the release of the blisk airfoil 106 or simulated blisk fan airfoil 110 in a well-timed and precise manner for a turbofan containment case fan blade off validation test of a blisk fan design if other release methods besides, or in addition to explosives, are used. Further details on fan blade release are disclosed in co-pending application Ser. No. 15/211,964, entitled "Method for Release of Fan Blisk Airfoil" filed herewith, the disclosure of which is hereby incorporated by reference herein.

Figure 7:
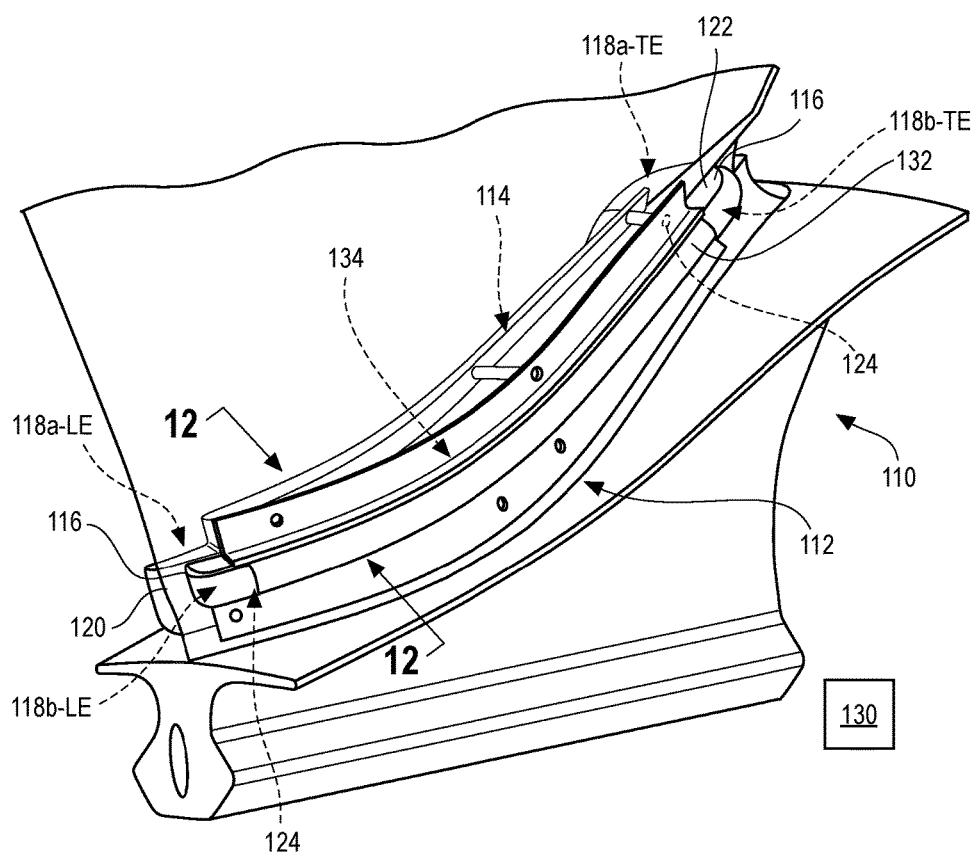
FIG. 7 shows an isometric view from one side of an external charge arrangement on a fan blade.

Alternatively, an external charge may be constructed about the exterior of the blisk airfoil 106 or simulated blisk fan airfoil 110. Referring to FIG. 7, an external shaped charge arrangement 112 on the sides of the airfoil 106, 110 is depicted. The external charge design 112 allows for a timed charge to be used for containment case validation testing such that the airfoil 106, 110 is released at a selected time. The external charge arrangement 112 cuts inward from both sides; from an exterior of the airfoil 106, 110 to and interior thereof. This is in contrast with the conventional drilled hole method wherein a charge arranged within the blade root 44 cuts outward in both or all directions. As will be detailed below with reference to FIGS. 17-19, the blade is weakened in specific and critical areas to provide interfacing to a shaped charge and ease release thereof.

Referring still to FIG. 7, the external charge arrangement 112 provides for simulating a blisk fan blade off event by cutting the conventional fan blade 36 at the airfoil 110 above the blade platform 46, just as the airfoil 106 is cut just above the hub fillet in the case of the blisk 100. When a new blisk design is not yet available for testing, and instead existing fan blades 36 are used as simulated blisk fan airfoils 110, a drilled hole may be more difficult to construct as the airfoil 48 of the conventional turbofan 34 is relatively thinner where it connects with the blade platform 46 as compared to where the blisk fan airfoil 106 meets the blisk hub 104 at the blisk connection point 108. Placing the external shaped charge 114 on the exterior of the airfoil 106, 110 at or near the blisk hub 104 or blade platform 46 severs the airfoil 106, 110 at the base thereof simulating the failure point of an operational blisk fan blade 102.

It is not desirable to release the blade root 44 or blade platform 46 as this may invalidate the test due to excess energy and geometric differences. The simulated blisk fan airfoil 110 is released from the fan blade 36 above the blade platform 46 because the release of the platform 46 and blade root 44 includes more mass than release of the blisk fan airfoil 106 alone. The additional mass alters the trajectory and impact of the released projectile during a fan blade off containment case test.

An example embodiment of a detonator holder 116 is shown in FIG. 8. The external shaped charge arrangement 112 includes first and second detonators 118a, 118b at each end of the arrangement 112. At the leading edge 120 of the airfoil 106, 110 the leading edge detonator holder 120 shown in FIG. 9 holds the first and second leading edge detonators 118a-LE, 118b-LE on the respective sides of the airfoil 106, 110. Likewise, the trailing edge detonator holder 122 shown in FIG. 10 holds the first and second trailing edge detonators 118a-TE, 118b-TE on the respective sides of the airfoil 106, 110. Each detonator holder 120, 122 is operatively coupled to end portions 124 of the one or more external shaped charges 114. The trailing edge detonators 118A-TE, 118b-TE and the leading edge detonators 118a-LE, 118b-LE may stimulate detonation simultaneously or according to selected times in order to achieve application specific release of the airfoil 106, 110. Alternatively, further detonators 118 may be aligned along the chordwise length of the airfoil 106, 110 to detonate according to a timed pattern at one or more points along the airfoil 106, 110.

In the example embodiment shown in FIG. 7, there are two external shaped charges 114 arranged such that one such charge 114 is on each side of the airfoil 106, 110. Each end 124 of each charge 114 is operatively coupled to the detonator holder 120, 122 of the respective end 124 such that opposing ends 124 of each charge 114 are operatively coupled to the leading-edge and trailing-edge detonator holders 120, 122 by way of the detonator 118 held therein against the ends 124 of the charge 114. The detonator holders 120, 122 are filled with explosive material such that upon detonation energy produced by the detonator(s) 118 is transferred to the ends 124 of the shaped charge(s) 114.

Each detonator 118 operates with a primary explosive 126 and electrical or electronic detonator mechanism 128. A mechanical or chemical detonator mechanism may be suitable; however, electrical and electronic detonators are typically easy to control and provide a high level of precision with minimal delay. The detonator mechanism 128 may be arranged fully or partially within the respective detonator holder 120, 122. Each detonator holder 120, 122 carries at least two detonator mechanisms 128 with one on each side of the airfoil 106, 110.

The detonator mechanism(s) 128 within each detonator holder 120, 122 are operatively coupled with a detonation controller 130. The detonation controller 130 may be located remote from the detonator mechanism(s) 128 or may be disposed somewhere on or proximal the external shaped charge arrangement 112. The detonation controller 130 may be in electrical or mechanical communication with the detonator mechanism(s) 128.

In an example embodiment, the detonation controller 130 is in electrical or mechanical communication with all four of the detonator mechanisms 128 of the external shaped charge arrangement 112. The detonation controller 130 may be programmable or operable with a suitable user interface. The detonation controller 130 sends precisely timed commands to the detonator mechanism(s) 128 in order to explode the external shaped charge(s) 114.

Within each detonator holder 120, 122 the detonator mechanism(s) 128 are configured to be in proximity to the respective primary explosive 126 packed into the openings 132 of each detonator holder 120, 122. The primary explosive 126 is an explosive charge selected to detonate the primary shaped external charge 114 in a controlled fashion. The primary explosive 126 is an explosive material that is sensitive to the stimulus provided by the detonator mechanism 128, such as impact, friction, heat, electrical charge, or another suitable stimulus. The primary explosive 126 is used to trigger the external shaped charge 114. The primary explosive is packed or pressed into the openings of the detonator holders 120, 122 between the detonator mechanism 128 and the end 124 of each shaped charge 114.

Figure 12:
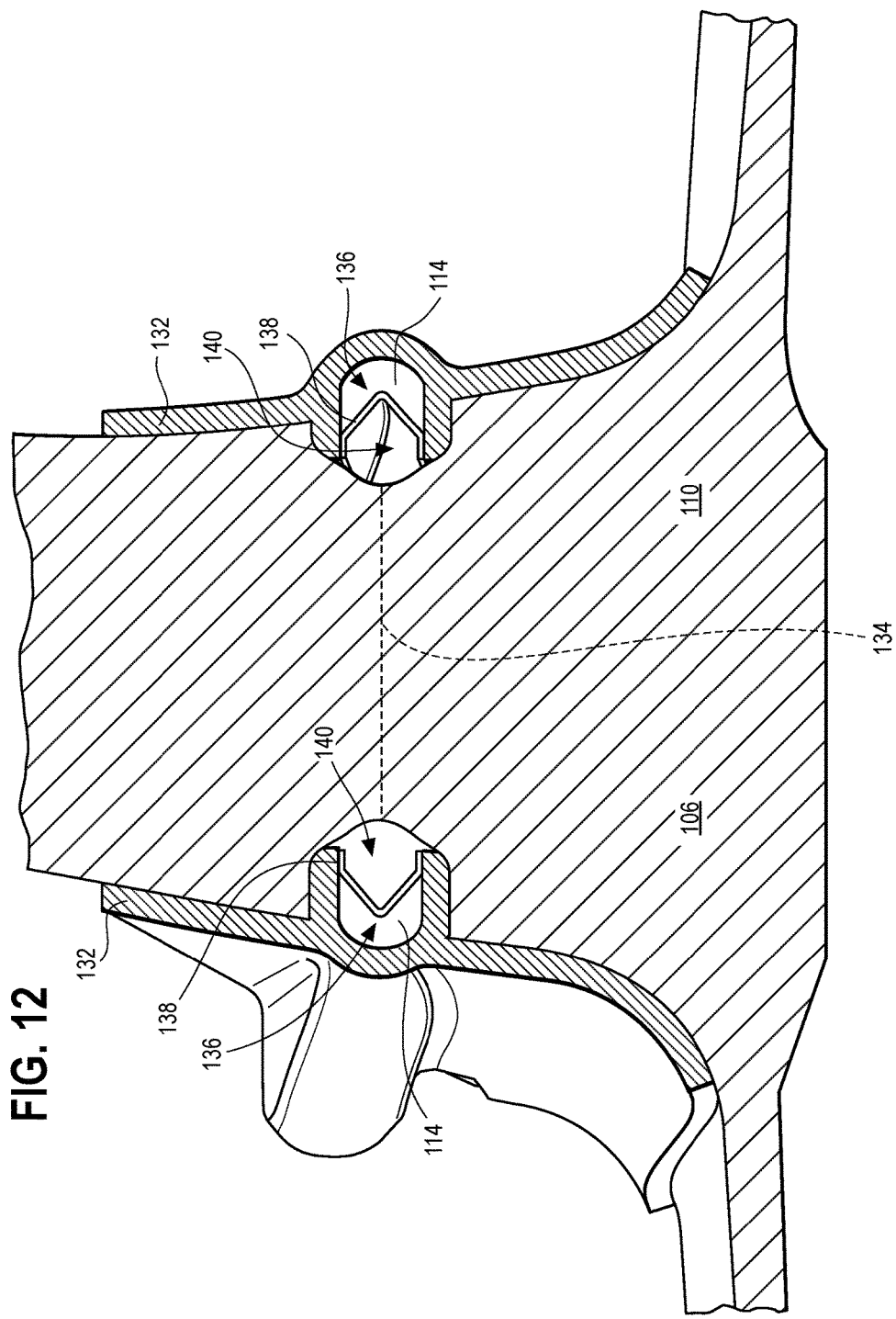
FIG. 12 shows a cross-sectional view of part of the fan blade and the external charge arrangement.
Figure 13:
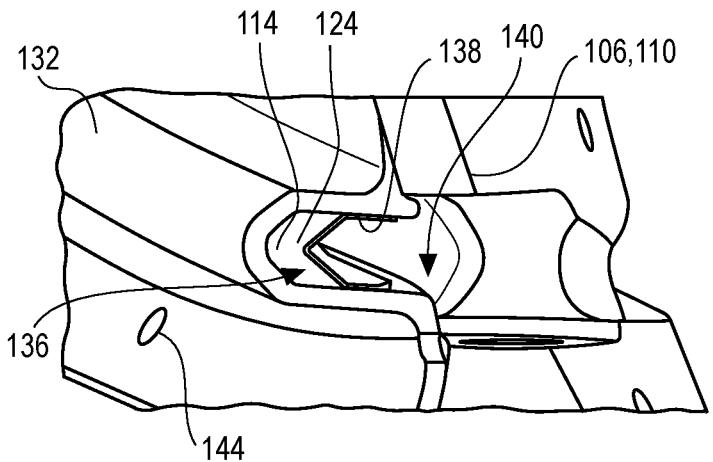
FIG. 13 shows a partial isometric view of the leading edge of the fan blade and the external charge arrangement with the detonator removed.
Figure 14:
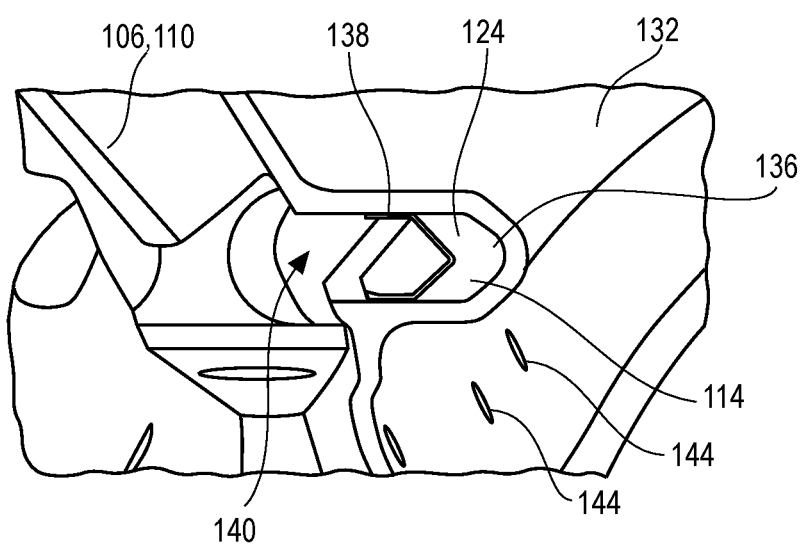
FIG. 14 shows a partial isometric view of the trailing edge of the fan blade and the external charge arrangement with the detonator removed.

Referring now to FIG. 11, each external shaped charge 114 is held in place by a charge holder 132. The charge holder 132 is made from aluminum or another suitably malleable metal capable of holding the explosive material of the external shaped charge 114 along the outside surface of the airfoil 106, 110. FIG. 12 shows a partial cross-sectional view of the airfoil 106, 110 including a cross-sectional view of the external shaped charge arrangement 112 taken along line 12-12 in FIG. 7. FIGS. 13 and 14 show further cross-sectional views at the leading edge and the trailing edge, respectively, of the airfoil 106, 110 with only one side of the external shaped charge arrangement 112 in place. FIGS. 13 and 14 also depict the external shaped charge arrangement 112 with the detonator 120, 122 removed from the respective end shown. The charge holder 132 rests along the surface of the airfoil 106, 110 both above and below the shaped charge 114. At the release point 134 of the airfoil 106, 110 the charge holder 132 provides a socket 136 for holding the shaped charge 114 and a charge liner 138.

As detailed hereinbelow, the shape of the charge 114 and liner 138 produces the blast focusing effect desired. Therefore, the charge holder 132 may be aluminum, or another relatively light workable metal, because it is not expected to withstand the blast but only to hold the charge 114 in place prior to detonation.

Figure 15:
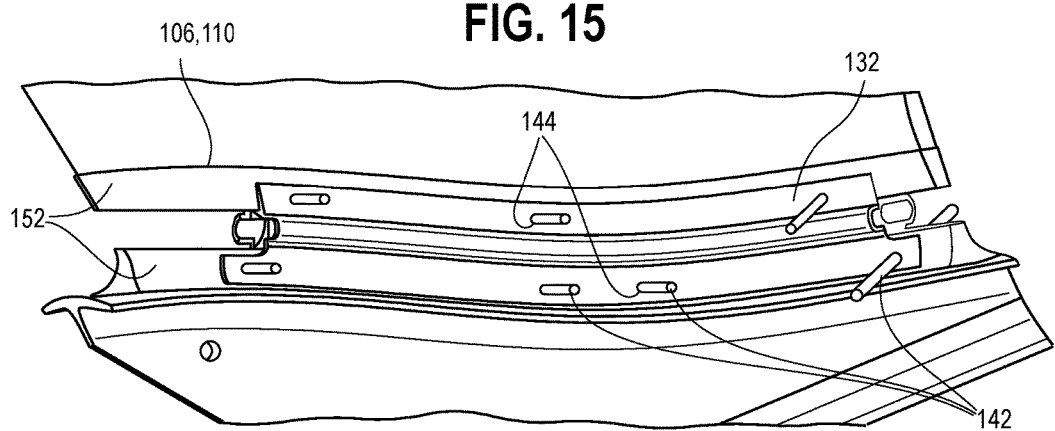
FIG. 15 shows a partial isometric view of the external charge arrangement with attachment pins inserted therein and the detonators removed.
Figure 16:
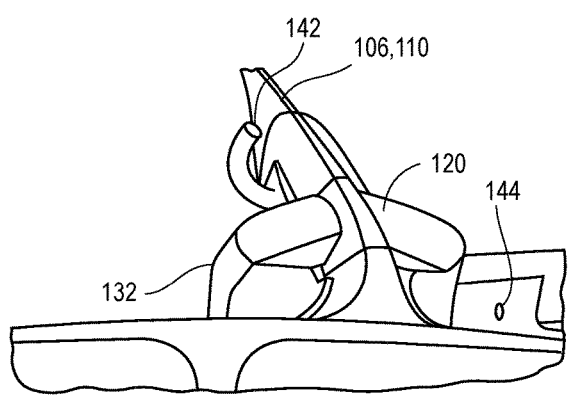
FIG. 16 shows an isometric view of the external charge arrangement with attachment pins and the detonator.

Referring now to FIGS. 15 and 16, attachment of the charge holder 132 is depicted. While the charge holder 132 is not expected to withstand the blast of the shaped charge 114, the charge holder 132 should be mounted such that the external shaped charge arrangement 112 is capable of withstanding the forces created when the turbofan engine 30 is spun up to maximum speed without detaching from the airfoil 106, 110. Pins 142 may be used to reliably attach the charge holder 132 and the entire external shaped charge arrangement 112 to the airfoil 106, 110. Holes for the pins may be drilled through the airfoil 106, 110 and aligned with corresponding holes 144 in the charge holder 132. Pins 142 are inserted through the holes 144, penetrating the charge holder 132 and the airfoil 106, 110. Upon insertion, the pins 142 are bent to hold in place the arrangement 112 penetrated thereby, as shown in FIG. 16.

The charge liner 138 may be silver or another suitable material for severing the airfoil 106, 110 from the fan blade 102, 36. The charge liner 138 in conjunction with the shape and position of the charge socket 136 operates according to the Munroe effect to focus the blast energy of the charge 114 towards the release point 134 of the airfoil 106, 110 thus cutting the airfoil 106, 110 from both sides. The severing action of the charge liner 138 is developed by the arrangement of the socket 136 in the charge holder 132 as well as a cavity 140 provided in the side surface of the airfoil 106, 110. The cavity 140 is formed by extricating a portion of material from the sidewalls of the airfoil 106, 110.

Upon detonation or deflagration of the external shaped charge 114, the charge liner 138 melts and accelerates through the socket 136 and cavity 140 towards the airfoil 106, 110 in order to produce the severing effect. Thus the alignment of the shaped charge(s) 114, the associated charge liner(s) 138, the charge holder socket(s) 136, and the cavity 140 on each side of the airfoil 106, 110 operates such that the liner(s) 138 cut the airfoil 106, 110 substantially transverse through the radial extent of the airfoil 106, 110 through the cavities 140.

In order to arrange the external charge in such a way that the airfoil 106, 110 release is well-timed and the airfoil 106, 110 is evenly released, the blade may need to be modified along the exterior surface thereof. Specific areas may need to be modified by extricating portions of the airfoil 106, 110 so as to create the cavities 140 described hereinabove. However, the cavities 140 may operate both to produce the blast focusing effect of the charge liner 138 and to selectively/strategically weaken the airfoil 106, 110 at the release point 132. The airfoil 106, 110 is sufficiently weakened in specific areas while also providing modifications to the surface thereof for interfacing to the external shaped charge 114, charge holder 132, and detonator holders 120, 122.

Figure 17:
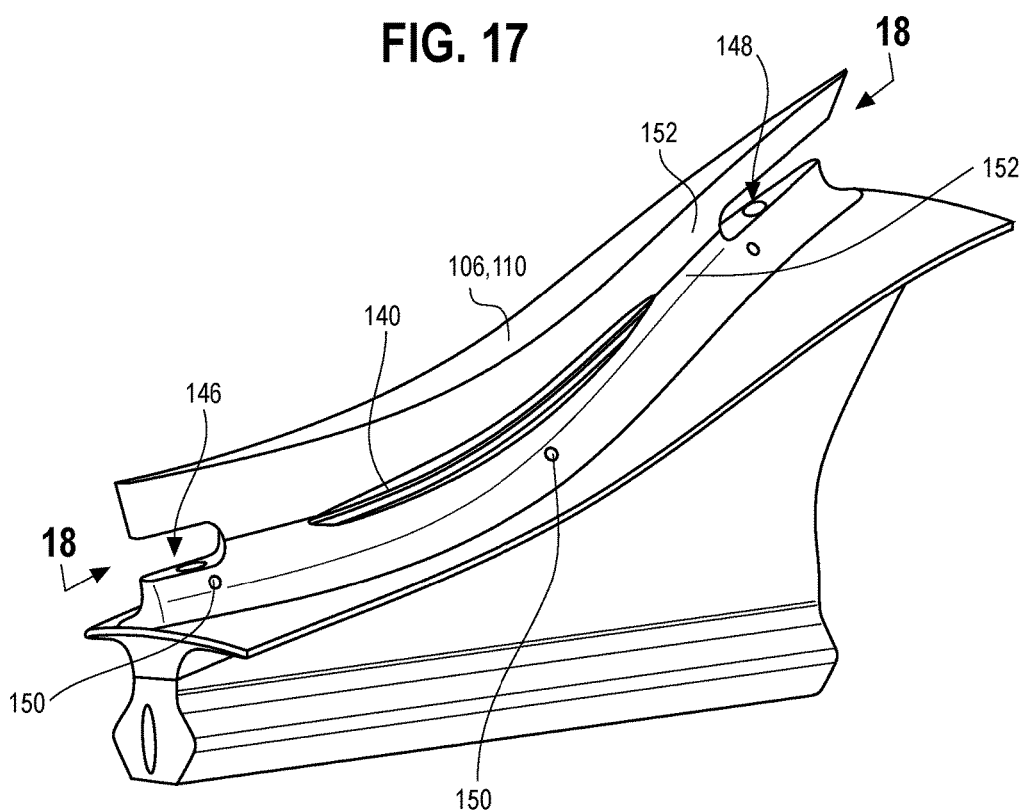
FIG. 17 shows an isometric view of the fan blade modifications.
Figure 18:
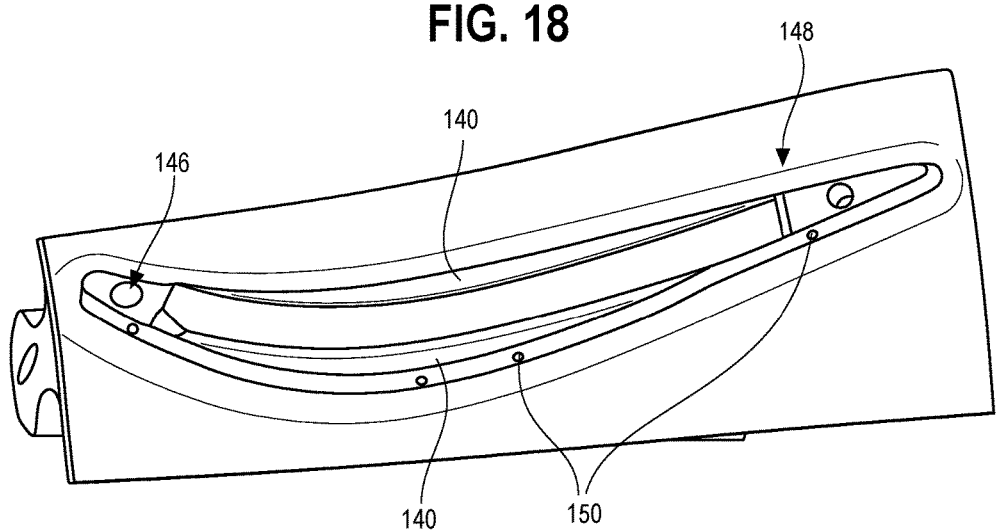
FIG. 18 shows a plan view from above of the fan blade modifications.

Referring now to FIG. 17, modifications to the airfoil 106, 110 are shown. Portions of material are extricating from the sidewalls of the airfoil 106, 110 to provide structural changes thereto. The blade modifications include front, leading and rear, trailing cutouts 146, 148 to house the respective detonator holders 120, 122, mounting holes 150 to allow for securely mounting the detonators 118-LE, 118-TE, and trenches 152 to mount the charge holder 132, provide strategic weakening of the release point 134 of the airfoil 106, 110, and to provide the cavity 140 for acceleration and proper cutting by the shaped charge 114, as discussed above with reference to FIGS. 12, 13, and 14. FIG. 18 depicts a cross-sectional view of the airfoil 106, 110 taken along the line 18-18 in FIG. 17, and viewed from above. This illustration shows the mounting holes 150 for securing the detonators to the leading and trailing edge cutouts 146, 148.

Figure 19:
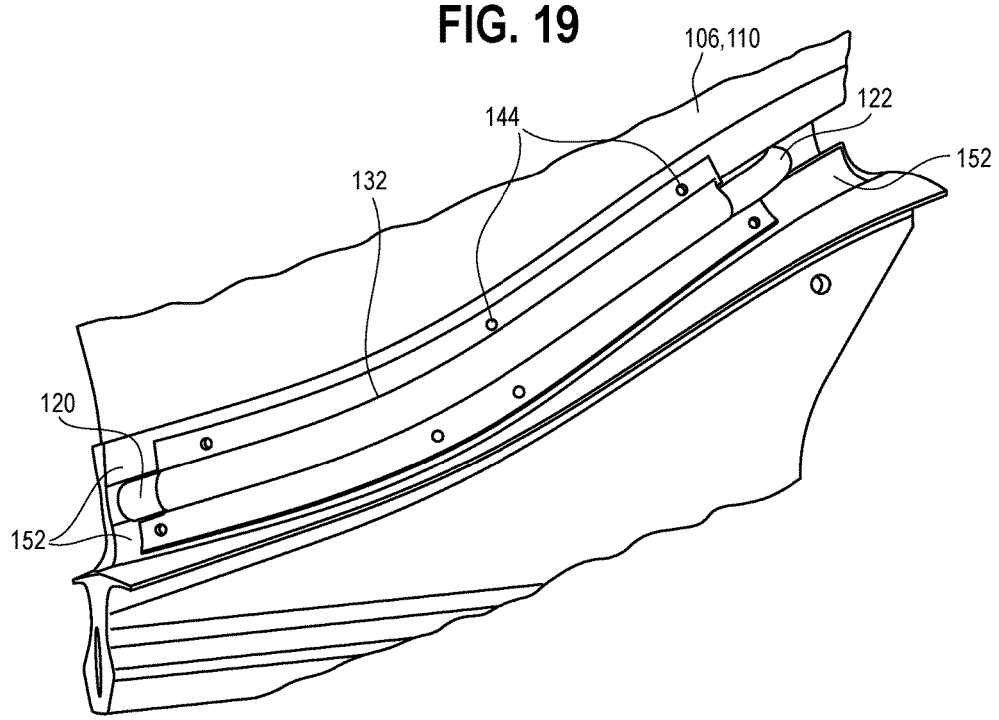
FIG. 19 shows an isometric view from one side of the external charge arrangement on the fan blade with modified portions of the fan blade shaded for reference.

FIG. 18 further shows the relative depth of trenches 152 on the respective sides of the airfoil 106, 110. The depth of the trenches 152 is deepest at the thickest section of the airfoil 106, 110 so as to simultaneously provide selective weakening of the airfoil 106, 110 at the thickest point thereof and provide the cavity 140 space to accelerate the charge liner 138 such that sufficient cutting power is achieved to sever the strategically weakened airfoil 106, 110. FIG. 19 depicts the external shaped charge arrangement 112 affixed to the airfoil 106, 110 with surface shading to better indicate the areas of blade modification where portions of the blade have been extricated to accommodate the charge holder 132.

The embodiment(s) detailed above may be combined in full or in part, with any alternative embodiment(s) described.

INDUSTRIAL APPLICABILITY

In summary, the present disclosure contemplates an external shaped charge arrangement for severing a blisk fan airfoil or a simulated blisk fan airfoil during testing of a containment case. The external shaped charge has multiple detonators for initiating the explosive materials at more than one point along the fan blade so as to increase the evenness and uniformity with which the fan blade is released. Likewise, the arrangement including more than one charge and more than one detonator provides for accurate timing for release of the fan blade such that an associated containment case for housing the blisk fan blade may be tested at selected points therealong. The shape of the blade used, the type of explosive charge used, the detonator used, and the contour of the external shaped charge may all be modified to fit a particular fan blade application or simulate a specific type of fan blade off event.

The timing of the fan blade release may be modified such that one end of the airfoil is released before another end. Likewise, the timing of the fan blade release may be modified such that the airfoil is released during powering up of a turbofan engine to be tested, during powering down of a turbofan engine to be tested, while a turbofan engine to be tested is operating at a maximal speed, or while a turbofan engine operates at a selected fan speed. Furthermore, in order to accommodate the changes in shape or material used in the external shaped charge arrangement described above, modification and weakening of the airfoil may be application specific all while adhering to the general principles of the design disclosed herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A method of releasing a fan blade for testing a turbofan engine, comprising:
    modifying an airfoil by extricating material from one or more external sides of the airfoil at one or more locations;
    placing one or more explosive charges adjacent the one or more locations;
    providing with the one or more explosive charges a liner between the one or more explosive charges and the one or more external sides of the airfoil;
    aligning the one or more explosive charges and the liner with the one or more cavities in the one or more sides of the airfoil; and
    detonating the one or more explosive charges such that the airfoil is released at a selected time and the liner accelerates through a cavity provided by the one or more cavities.

2. The method of claim 1, further comprising:
    modifying the airfoil by extricating a first portion of material from a leading edge to provide a first cut out;
    modifying the airfoil by extricating a second portion of material from a trailing edge to provide a second cut out; and
    arranging one or more detonators in the first cut out or the second cut out.

3. The method of claim 2, further comprising:
    modifying the airfoil by extricating additional portions of material from one or more sides of the airfoil; and
    aligning the one or more explosive charges with one or more cavities formed in the one or more sides of the airfoil by the extricating of the additional portions.

4. The method of claim 3, further comprising:
    selectively weakening the airfoil by extricating the additional portions of material from the one or more sides of the airfoil;
    wherein, by aligning the one or more explosive charges and the liner with the one or more cavities in the one or more sides of the airfoil, the liner operates in combination with the selective weakening such that the airfoil is evenly released.

5. The method of claim 1, wherein the liner cuts through the airfoil from an exterior of the airfoil toward an interior of the airfoil.

6. The method of claim 5, wherein the liner cuts through the airfoil from both first and second sides of the one or more sides of the airfoil.

7. The method of claim 3, further comprising:
    arranging a first detonator holder in the first cut out;
    arranging a second detonator holder in the second cut out; and
    holding with the first and second detonator holders the one or more detonators.

8. The method of claim 7, wherein the one or more explosive charges comprises an external shaped charge and further comprising:
    holding the external shaped charge to first and second sides of the one or more sides of the airfoil with first and second charge holders;
    the first and second detonator holders in combination with the first and second charge holders detonating the external shaped charge such that the airfoil is evenly released.

9. The method of claim 8, further comprising:
    detonating the external shaped charge from both the first and the second sides of the airfoil at both the leading edge and the trailing edge such that the airfoil is evenly released.

10. The method of claim 9, further comprising:
    controlling the detonating of the external shaped charge with a detonation controller that is operatively coupled to the one or more detonators.

11. The method of claim 9, further comprising:
    detonating the external shaped charge from both the first and second sides of the airfoil at both the leading edge and the trailing edge simultaneously.

12. An assembly for releasing a fan blade from a turbofan engine during testing, comprising:
    an airfoil;
    an external shaped charge arranged about the airfoil;

one or more detonators operatively coupled to the external shaped charge;
   wherein the airfoil is modified to accommodate the external shaped charge; and
   wherein the airfoil is modified to selectively weaken the airfoil; and
a liner arranged in a cavity along first and second sides of the airfoil, wherein the one or more detonators detonate the external shaped charge to cause the liner to cut the airfoil from an exterior of the airfoil toward an interior of the airfoil.

13. The assembly of claim 12, further comprising:
first and second charge holders;
wherein the first charge holder is on the first side of the airfoil and the second charge holder is on the second side of the airfoil; and
wherein the cavity is formed by a combination of at least one of the first and second charge holders and modification of the airfoil by removing material at selected locations on the first and the second sides of the airfoil.

14. The assembly of claim 13, further comprising:
a leading edge and a trailing edge of the airfoil; and
first and second cut outs;
   wherein the first cut out is formed by modifying the leading edge of the airfoil; and
   wherein the second cut out is formed by modifying the trailing edge of the airfoil.

15. The assembly of claim 14, further comprising:
first and second detonator holders, wherein each of the first and the second detonator holders holds one or more detonators;
wherein the first detonator holder is disposed within the first cut out;
wherein the second detonator holder is disposed within the second cut out; and
wherein the one or more detonators held by each of the first and the second detonator holders is stimulated such that the external shaped charge on the first side and the second side of the airfoil is detonated to evenly release the airfoil.

16. A method of simulating a blisk fan blade off event, comprising:
arranging an external shaped charge about a fan blade;
wherein the external shaped charge is disposed radially outside of a blade platform and a blade root;
providing a liner between the external shaped charge and the fan blade; and
detonating the external shaped charge such that the liner accelerates into the fan blade and the fan blade is released; wherein the portion of the fan blade outside of the blade platform is released while the blade platform and the blade root are not released; and
wherein the portion of the fan blade released by the external shaped charge comprises at least a portion of a simulated blisk airfoil.

17. The method of claim 16, further comprising:
modifying the fan blade to mount one or more detonator holders, one or more detonators, and one or more charge holders; and
modifying the fan blade to strategically weaken the fan blade such that the portion of the fan blade is evenly released.

18. The method of claim 17, further comprising:
detonating the external shaped charge with more than one detonator;
detonating the external shape charge from more than one location along the external shaped charge; and
timing the detonation of the external shaped charge such the portion of the fan blade is evenly released.

* * * * *